(12) United States Patent
Greb

(10) Patent No.: US 8,336,953 B2
(45) Date of Patent: Dec. 25, 2012

(54) MOUNT FOR FASTENING A MOTOR VEHICLE MODULE

(75) Inventor: Thilo-Stefan Greb, Nieder-Ohmen (DE)

(73) Assignee: GM Global Technology Operations LLC, Detroit, MI (US)

( * ) Notice: Subject to any disclaimer, the term of this patent is extended or adjusted under 35 U.S.C. 154(b) by 238 days.

(21) Appl. No.: 12/598,897

(22) PCT Filed: Apr. 12, 2008

(86) PCT No.: PCT/EP2008/002917
§ 371 (c)(1),
(2), (4) Date: Apr. 16, 2010

(87) PCT Pub. No.: WO2008/135136
PCT Pub. Date: Nov. 13, 2008

(65) Prior Publication Data
US 2010/0201160 A1  Aug. 12, 2010

(30) Foreign Application Priority Data
May 4, 2007  (DE) .......................... 10 2007 020 928

(51) Int. Cl.
*B60R 11/00* (2006.01)
(52) U.S. Cl. ............. 296/193.04; 296/193.09; 296/37.1; 180/68.5; 224/547; 224/902
(58) Field of Classification Search ................. 296/1.01, 296/193.04, 193.09, 203.02, 37.1; 180/68.5; 224/414, 459, 511, 547, 556, 557, 902
See application file for complete search history.

(56) References Cited

U.S. PATENT DOCUMENTS

| 2,797,852 | A | * | 7/1957 | Michalski ..................... 224/546 |
| 5,086,860 | A | * | 2/1992 | Francis et al. ................ 180/68.5 |
| 5,536,595 | A | * | 7/1996 | Inkmann et al. .............. 429/120 |
| 6,474,727 | B1 | | 11/2002 | Guyomard |
| 6,997,239 | B2 | | 2/2006 | Kato |

(Continued)

FOREIGN PATENT DOCUMENTS
DE  3404887 A1  8/1985
(Continued)

OTHER PUBLICATIONS

International Search Report for Appln. No. PCT/EP2008/002917, dated Nov. 26, 2008.

(Continued)

*Primary Examiner* — Glenn Dayoan
*Assistant Examiner* — Gregory Blankenship
(74) *Attorney, Agent, or Firm* — Ingrassia Fisher & Lorenz, P.C.

(57) ABSTRACT

A mount is provided for fastening a motor vehicle module on a motor vehicle, having a fastening section, using which the module is fastenable on the motor vehicle, and having a support section angled therefrom, in order to place the module thereon. The support section has a receptacle, into which a pin of the module is insertable in the vertical direction (z), the pin being longitudinally displaceable in the receptacle in a predetermined direction (x) in the inserted state, the fastening section having a receptacle, into which a tab of the module can be introduced upon a movement in the cited direction (x), and having a cantilever, which is implemented to produce a positive connection with a safeguard block associated with the module.

11 Claims, 3 Drawing Sheets

U.S. PATENT DOCUMENTS

| | | | |
|---|---|---|---|
| 7,237,831 B2 * | 7/2007 | Yamamoto et al. | 296/193.04 |
| 7,607,723 B2 * | 10/2009 | Bierjon et al. | 296/203.02 |
| 7,726,427 B2 * | 6/2010 | Picavet | 180/68.5 |
| 7,913,786 B2 * | 3/2011 | Voigt et al. | 180/68.5 |
| 2005/0180850 A1 | 8/2005 | Kato | |
| 2010/0007177 A1 * | 1/2010 | Tomimatsu | 296/203.02 |
| 2010/0201160 A1 * | 8/2010 | Greb | 296/193.04 |
| 2011/0089720 A1 * | 4/2011 | Matsuura et al. | 296/193.09 |

FOREIGN PATENT DOCUMENTS

| | | | |
|---|---|---|---|
| DE | 8810520 U1 | 11/1988 | |
| DE | 4225253 A1 | 2/1994 | |
| DE | 10208124 A1 | 11/2002 | |
| DE | 10252879 A1 | 5/2004 | |
| DE | 202004011632 U1 | 9/2004 | |
| DE | 10343697 A1 | 6/2005 | |
| DE | 102004058361 A1 | 6/2006 | |
| DE | 102004060788 A1 | 7/2006 | |
| DE | 102005002058 A1 | 9/2006 | |
| EP | 1067004 A1 | 1/2001 | |
| EP | 2354488 A1 | 8/2011 | |
| FR | 2824309 A1 | 11/2002 | |
| JP | 59012850 * | 7/1981 | 296/203.02 |
| JP | 7324623 A | 12/1995 | |
| JP | 2001097052 A | 4/2001 | |

OTHER PUBLICATIONS

German Patent Office, German Search Report, mailed Nov. 8, 2007 for Appln. No. DE102007020928.4.

* cited by examiner

MOUNT FOR FASTENING A MOTOR VEHICLE MODULE

CROSS-REFERENCE TO RELATED APPLICATIONS

This application is a U.S. National-Stage entry under 35 U.S.C. §371 based on International Application No. PCT/EP2008/002917, filed Apr. 12, 2008, which was published under PCT Article 21(2) and which claims priority to German Application No. 102007020928.4, filed May 4, 2007, which are all hereby incorporated in their entirety by reference.

TECHNICAL FIELD

The invention relates to a mount, using which a module of a motor vehicle, such as a coolant compensating container of the motor vehicle engine cooler, can be fastened on the vehicle body or on another component of the vehicle without screws.

BACKGROUND

DE 103 43 697 A1 describes a mounting device, using which a spherical compensating container can be fastened on a motor vehicle body. The container has a projection in its lower area, which engages in an opening of the mounting device. The mount has at least one lateral projection, which engages in a corresponding opening of the compensating container (or vice versa). A flexible detent element secures the compensating container in its upper area.

It is an object of one embodiment of the invention to provide a mount for fastening a motor vehicle module, which is secured well in all three spatial directions without screws. A further object comprises providing a motor vehicle module, which can be fastened using the above-mentioned mount. In addition, other objects, desirable features, and characteristics will become apparent from the subsequent summary and detailed description, and the appended claims, taken in conjunction with the accompanying drawings and this background.

SUMMARY

The first aspect relates to a mount for fastening a motor vehicle module on a motor vehicle. The mount has a fastening section, using which the module is fastenable on the motor vehicle, and a support section angled therefrom, in order to place the module thereon. The support section, which is situated horizontally, for example, has a receptacle into which a pin of the module is insertable in the vertical direction, the pin being longitudinally displaceable in a predetermined direction in the receptacle in the inserted state. The fastening section has, on the one hand, a receptacle in which a tab of the module can be introduced upon its movement in the cited predetermined direction, and, on the other hand, a cantilever, which is implemented to form a positive connection with a safeguard block associated with the module.

The proposed mount represents a three-point mount for the motor vehicle module, i.e., the module is secured by the mount at three points, namely by the two receptacles and by the cantilever. The module is thus, on one hand, secured twist-locked in the horizontal direction and, on the other hand, reliably secured in the vertical direction.

The motor vehicle module has a downwardly protruding pin, which is molded on, for example, on its lower side. The pin can be received by the receptacle of the support section. This receptacle is implemented so that the pin is guided along the cited predetermined direction after its insertion and can be longitudinally displaced, e.g., via a channel or a slot.

After the first mounting step of vertically lowering the motor vehicle module, a simple longitudinal displacement is performed in the predetermined direction. Securing occurs at all three cited fastening points simultaneously due to the longitudinal displacement. In an optional third step, if desired, the positive connection, which the cantilever of the mount and the associated safeguard block of the module form, can be secured using safeguard means such as a clamp.

The installation of the module is accordingly performed simply by two sequential movements in different spatial directions. No additional fasteners such as screws are required for this purpose, so that the installation time is short with a minimum member of parts used. The installation is also reliably achieved if there is little space around the intended position of the module. Furthermore, the installation is achieved both manually and also using robots, and can thus always be performed cost-effectively as a function of the production location.

The mount allows precise positioning of the module in a motor vehicle with few tolerance problems. If the mount is fastened on the vehicle, for example, the vehicle body, by welding, rattling noises and oscillations may be permanently prevented by the good seat of the mount.

In a second embodiment, the pin is secured in the vertical direction after its longitudinal displacement by a form fit by the receptacle of the support section. The receptacle can be an oblong hollow profile provided with an axial slot for this purpose, for example, into which the pin is insertable in the longitudinal direction. After the insertion, the pin is secured in the slotted area by a form fit in the vertical direction.

In a third embodiment, a recess which tapers in the predetermined direction is provided as the receptacle of the support section. The pin is additionally secured by a nonpositive connection by the tapering.

In a further embodiment, a continuous oblong opening having varying and/or changeable width is provided as the receptacle of the support section. The pin of the module is inserted and displaced longitudinally in this opening. Positive securing may be implemented in the vertical direction, in that the pin is equipped with a peripheral groove. The continuous opening provides tactile feedback, which simplifies the fastening of the motor vehicle module, in regard to whether the pin has arrived in the correct position, in order to be moved in the longitudinal direction.

In a further embodiment, the fastening section has an embossed area, which, together with the part of the vehicle, e.g., the vehicle body section, on which the fastening section is fastenable, forms the receptacle (of the fastening section). With minimal material used, this represents a simple possibility for providing an oblong receptacle, for example, into which the tab of the module is inserted axially and, for example, also horizontally in this case. It results from the above statements that the longitudinal direction of the receptacle of the fastening section is coincident with the predetermined direction of the receptacle of the support section, so that the module is fastened via these two points using a single longitudinal movement.

Furthermore, a further embodiment provides that a safeguard is provided to secure the positive connection. The positive connection between the safeguard block of the module and the cantilever, which is preferably a form fit in all three spatial directions, prevents detachment of the connection due to shaking movements of the motor vehicle.

A second aspect of the invention relates to a motor vehicle module to be fastened on a motor vehicle by a mount according to one of the above-mentioned embodiments. The motor vehicle module, which is simply referred to as a module in the context of this description, comprises plastic such as polypropylene, for simple. The motor vehicle module has a floor face and a lateral face. The floor face has a protruding pin, which is molded on, for example, and which is used for the purpose of being inserted into the receptacle of the support section of the mount described above. The lateral face has a tab which is implemented to be introduced into a receptacle associated with the fastening section of the mount upon a movement in a predetermined direction, and a safeguard block, which is implemented to form a positive connection with a cantilever associated with the mount when the tab has been introduced into the receptacle.

The proposed module may be installed rapidly in connection with the above-mentioned mount during the production of the vehicle and is maintenance friendly. The statements on the mount otherwise apply accordingly.

In one embodiment, the pin has a peripheral groove. In this way, the pin may be inserted into a first area of the receptacle of the support section, which is provided with a greater diameter and, because of the nut, be transferred via the longitudinal movement into a second area which is provided with a smaller diameter. The groove simultaneously prevents the pin from unintentionally leaving the cited receptacle in the vertical direction through a form fit.

Furthermore, a further embodiment provides that the module is implemented as a container for brake fluid, windshield cleaning fluid, or coolant liquid. In the case of a coolant compensating container, it can be fastened with the mount described above on a suspension strut top mount. Alternatively, the module can also be a motor vehicle battery.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
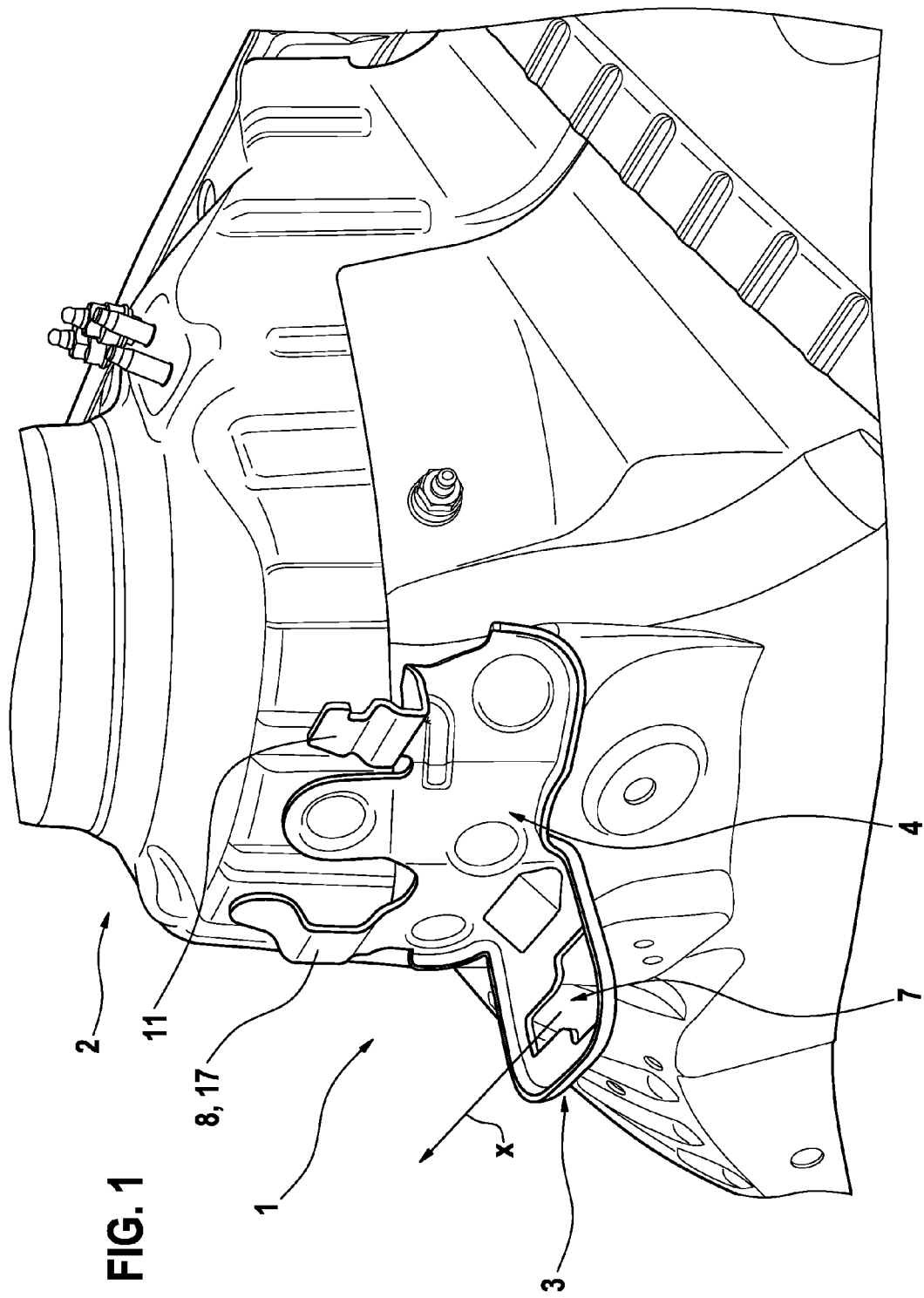
FIG. 1 shows a mount fastened on a suspension strut top mount in a perspective side view.

In the figures, which generally identify identical components using identical reference numerals, FIG. 1 shows a mount 1 made of a steel plate, which is fastened on a suspension strut top mount 2. The mount 1 has a support section 3 and a fastening section 4 angled thereto, the latter being welded to the suspension strut top mount 2.

Figure 2:
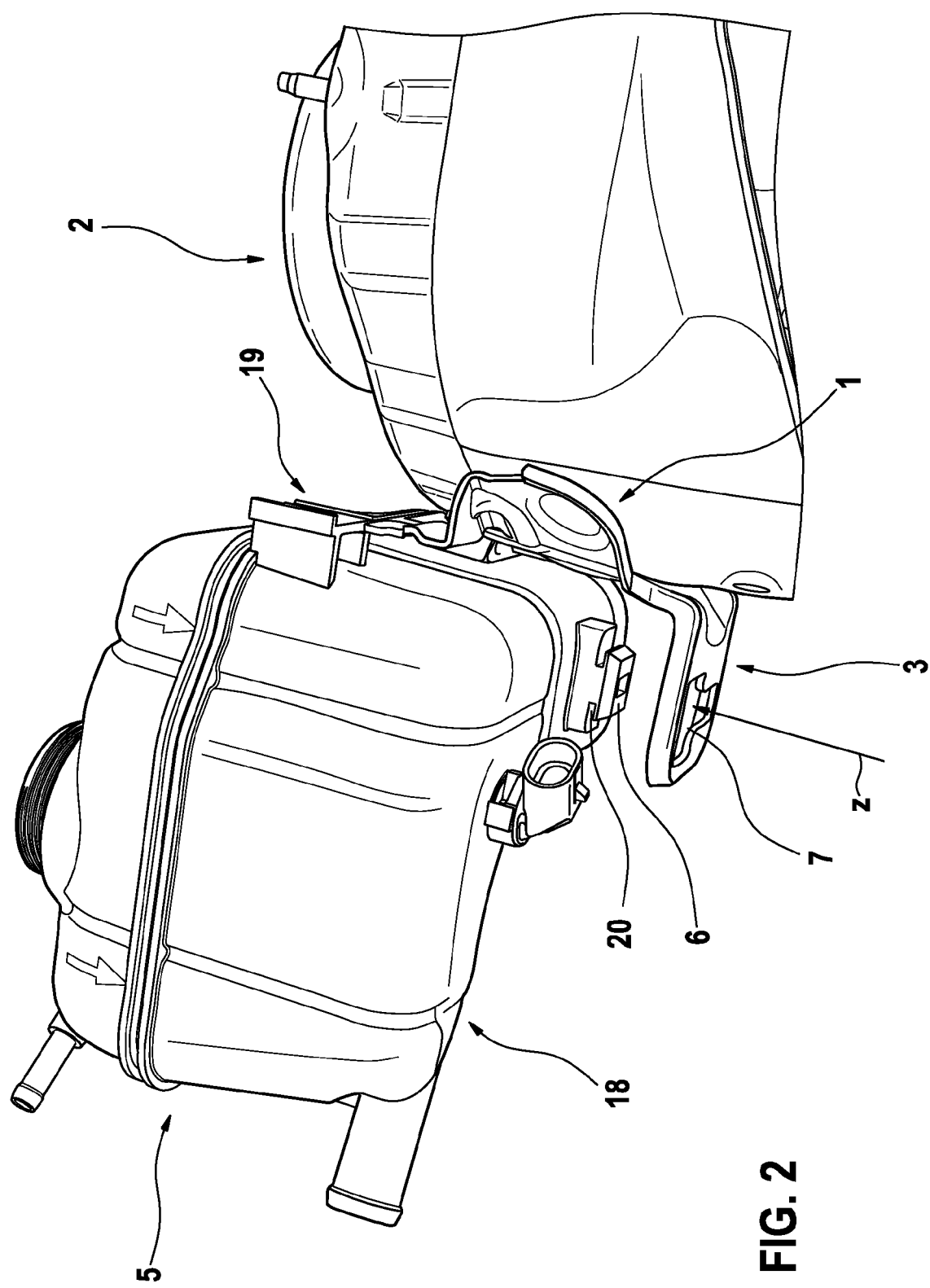
FIG. 2 shows the mount from FIG. 1 in the perspective side view during the first installation step.

FIG. 2 shows the mount 1 from FIG. 1 in a perspective side view from below during the first installation step for a motor vehicle module 5 in the form of a coolant compensating container. It has a floor face 18 and a lateral face 19. During this first installation step, the motor vehicle module 5 is lowered opposite to the direction of the arrow z, which stands for the vertical direction. The pin 6 molded onto the floor face 19 is inserted into the receptacle 7.

It is obvious from FIG. 1 that the receptacle 7 of the support section 3 has a continuous opening having changeable width relative to the longitudinal direction, i.e., the x direction. The opening approximately has the shape of a keyhole. During the second installation step of the motor vehicle module 5, it is moved in the direction of the arrow x, which is to stand for a x direction. During this movement, it is secured in the vertical direction by a positive connection because of the peripheral groove 20 of the pin 6 (not shown).

Figure 3:
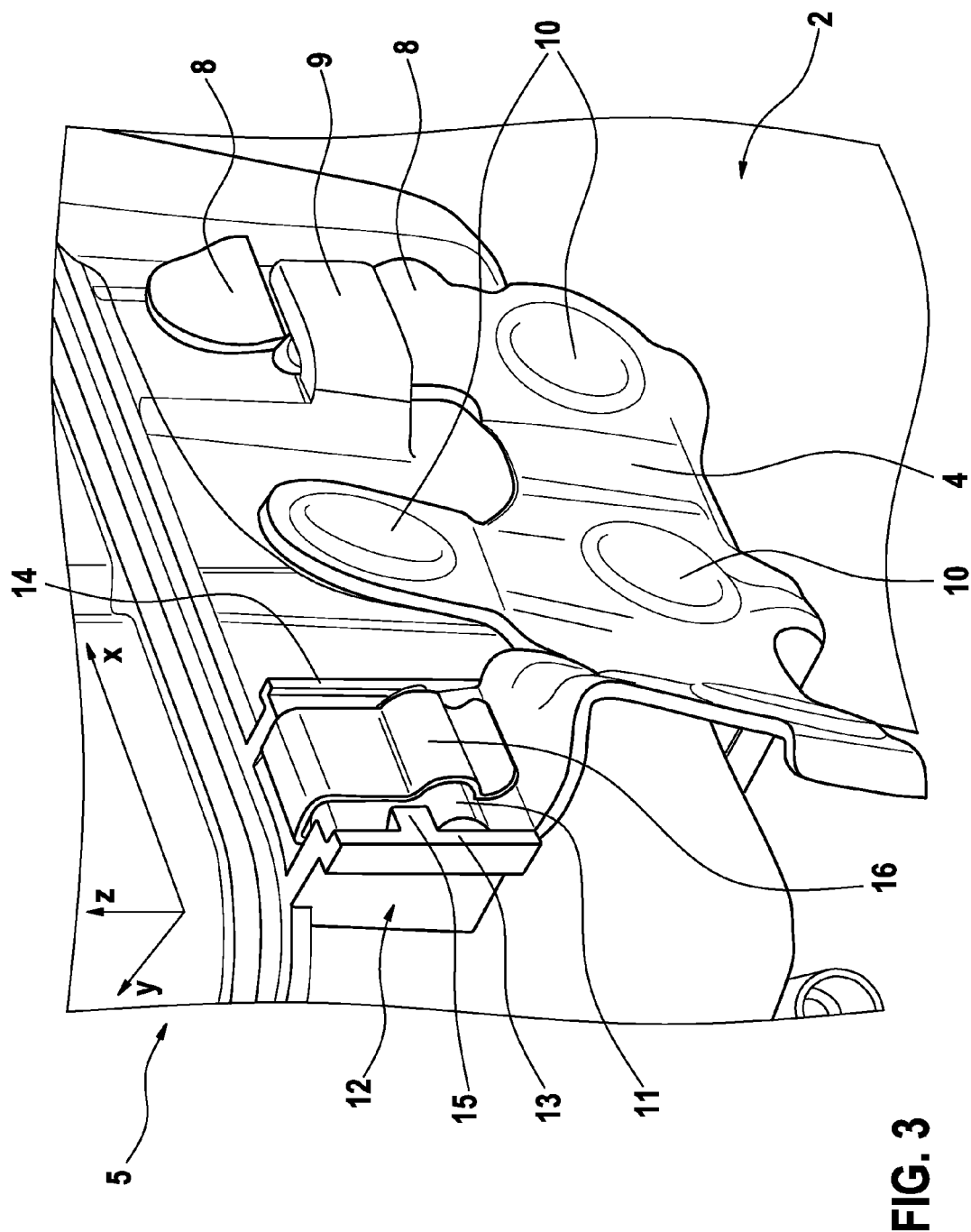
FIG. 3 shows the fastening area of the mount from the perspective of the suspension strut top mount.

It can be recognized in FIG. 1 that the fastening section 4 of the mount 1 has a receptacle 8 and a cantilever 11. If the pin 6 has been pushed into the receptacle 7 by a displacement in the x direction up to the stop, a fastening situation results at the fastening section 4 as shown by FIG. 3. FIG. 3 shows the mount 1 from a perspective inside the suspension strut top mount 2.

FIG. 1, together with FIG. 3, shows that the fastening section 4 has a receptacle 8, into which a tab 9 molded onto the motor vehicle module 5 can be introduced. The receptacle 8 is formed by an embossed area 17 of the fastening section 4, so that it is spaced apart from the suspension strut top mount 2 in the embossed area and an oblong channel for the tab 9 is implemented there. The tab 9 is inserted laterally into the receptacle 8 by moving the module 5 in the x direction, when the motor vehicle module 5 is displaced in the x direction after the insertion of the pin 6 into the receptacle 7.

Furthermore, the fastening section 4, which is welded via circular spot welds 10 to the suspension strut top mount 2, has a cantilever 11. It is used for the purpose of producing a positive connection with the safeguard block 12 of the motor vehicle module 5, whereby the intended position of the motor vehicle module 5 can be precisely maintained.

In the design of the positive connection of FIG. 3, there is a form fit in all three spatial directions: the two vertical ribs 13 and 14 prevent a movement of the cantilever 11 in the x direction by a form fit. A form fit results in the z direction with the aid of the projection 15. The clamp 16 secures the cantilever 11 in the y direction.

In the embodiment shown by FIG. 1 through FIG. 3, installation of the motor vehicle module 5 is performed in a first step in that it is lowered in the z direction and it is displaced in the x direction in a second step. In an optional third step, the positive connection of the cantilever 11 to the safeguard block 12 is secured with the aid of the safeguard 16 in the form of a clamp. The installation is performed without additional fasteners except the safeguard 16, and is possible even if there is little space around the motor vehicle module 5 in the motor vehicle.

Although a concrete embodiment was described above, one skilled in the art will recognize that the description of this embodiment is not for the purpose of restricting the invention in the disclosed form. Rather, the invention is to comprise all modifications, equivalents, and alternatives which are in the protective scope of the claimed invention. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A mount for fastening a motor vehicle module on a motor vehicle, comprising:

a fastening section adapted to fasten the motor vehicle module on the motor vehicle, the fastening section comprising a receptacle into which a tab of the motor vehicle module can be introduced upon a movement in a predetermined direction;

a cantilever which is implemented to produce a positive connection with a safeguard block associated with the motor vehicle module; and a support section angled from the fastening section in order to receive the motor vehicle module, wherein the support section comprising a receptacle into which a pin of the motor vehicle module is insertable in a vertical direction and longitudinally displaceable in the receptacle in the predetermined direction in an inserted state.

2. The mount according to claim 1, wherein the pin is positively secured in the vertical direction after a longitudinal displacement by the receptacle of the support section.

3. The mount according to claim 1, wherein a recess which tapers in the predetermined direction is provided as the receptacle of the support section.

4. The mount according to claim 3, wherein the recess is implemented as a continuous oblong opening having a varying width.

5. The mount according to claim 1, wherein the fastening section has an embossed area, which together with the vehicle body section on which the fastening section is fastened, forms the receptacle of the fastening section.

6. The mount according to claim 1, wherein the receptacle of the fastening section is implemented for a horizontal introduction of the tab of the motor vehicle module in the predetermined direction.

7. The mount according to claim 1, wherein a safeguard is provided to secure the positive connection of the cantilever to the safeguard block of the module.

8. The mount according to claim 1, wherein the motor vehicle module further comprises:
 a floor face having the pin; and
 a lateral face, the lateral face, comprising the tab which is implemented to be introduced into the receptacle associated with the mount upon the movement in the predetermined direction and the safeguard block which is implemented to produce the positive connection with the cantilever associated with the mount when the tab is introduced into the receptacle.

9. The mount according to claim 8, wherein the pin has a peripheral groove.

10. The mount according to claim 1, wherein the motor vehicle module is implemented as a container for a fluid.

11. The mount according to claim 1, wherein the motor vehicle module is implemented as a motor vehicle battery.

* * * * *